Aug. 10, 1926.
W. MAYER
TRAILER HOIST AND COUPLER
Filed July 18, 1925   3 Sheets-Sheet 1
1,595,902
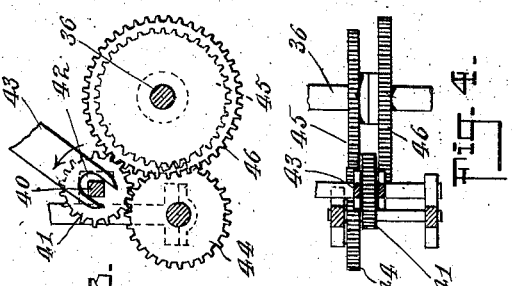
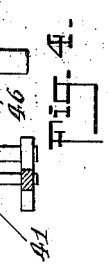
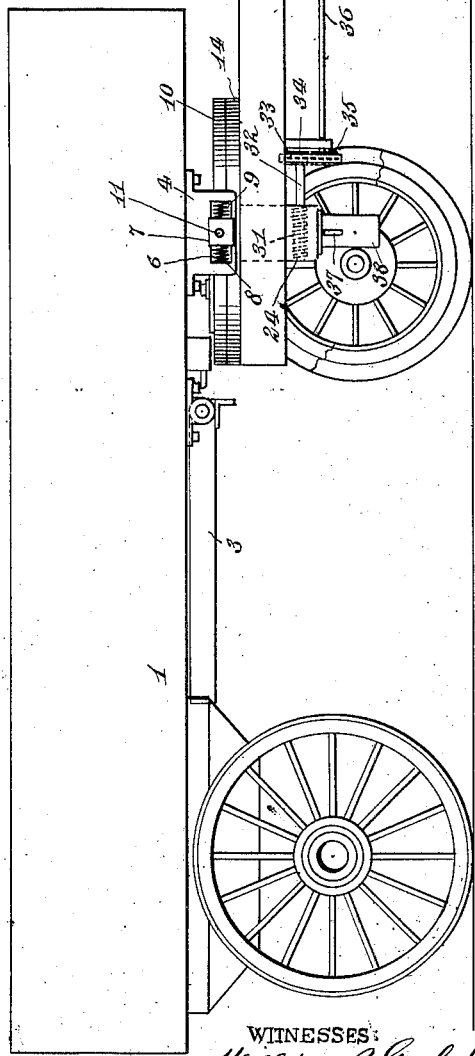
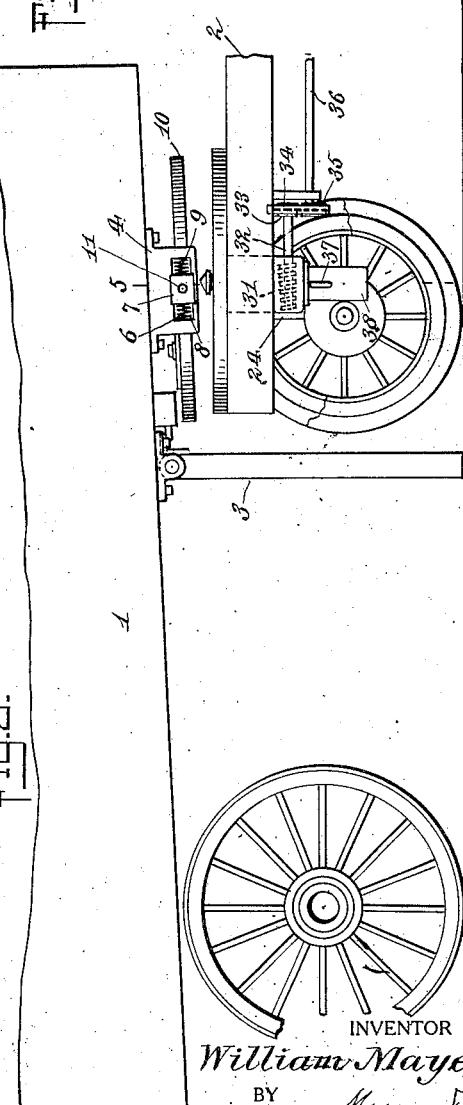
INVENTOR
*William Mayer.*
BY
ATTORNEYS
WITNESSES:

Aug. 10, 1926.

W. MAYER

TRAILER HOIST AND COUPLER

Filed July 18, 1925

WITNESSES

INVENTOR
William Mayer.
BY
ATTORNEYS

Aug. 10, 1926.
W. MAYER
TRAILER HOIST AND COUPLER
Filed July 18, 1925  3 Sheets-Sheet 3
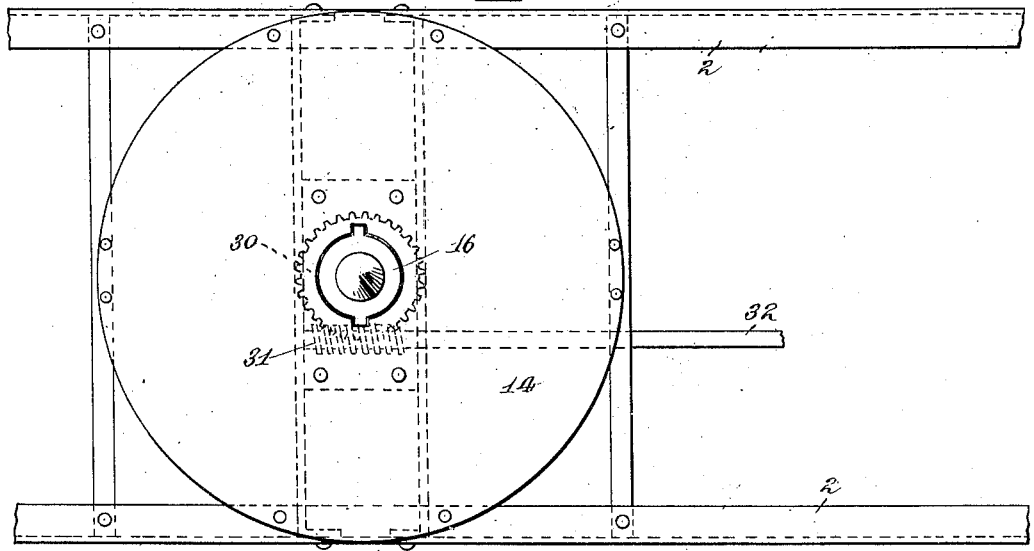
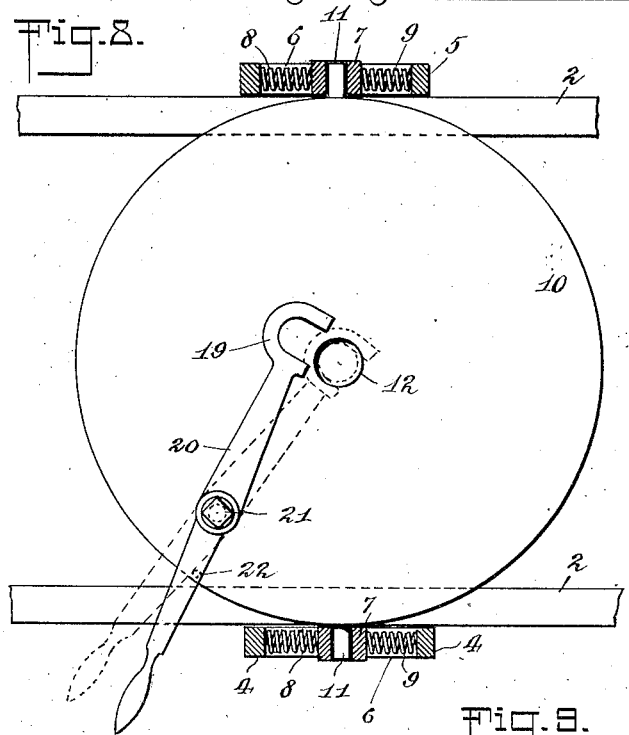
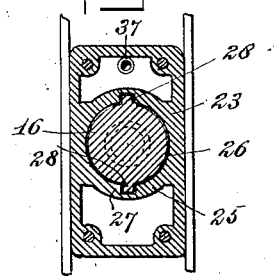
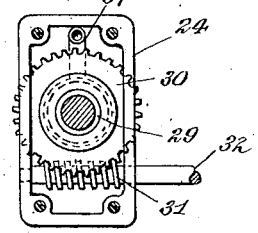
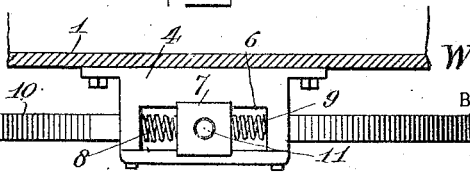
WITNESSES
William P. Goebel
A. L. Kitchin
INVENTOR
William Mayer
BY
ATTORNEYS Patented Aug. 10, 1926.

1,595,902

UNITED STATES PATENT OFFICE.

WILLIAM MAYER, OF BROOKLYN, NEW YORK.

TRAILER HOIST AND COUPLER.

Application filed July 18, 1925. Serial No. 44,518.

This invention relates to tractors and trailers and particularly to an improved trailer hoist and coupler and has for an object to provide an improved construction for transmitting power from the engine of the tractor to one end of the trailer for raising or lowering the same.

Another object of the invention is to provide an improved trailer hoist and coupler wherein the coupling pin sustains the weight only during the hoisting operation.

A further object, more specifically, is to provide a trailer hoist and coupler wherein a single centrally positioned hoisting pin is provided and associated with certain parts whereby a proper support is provided for the trailer which will allow a certain flexing and at the same time the pin is permitted to function either as an elevating member or as a connecting member.

In the accompanying drawngs—

Figure 1 is a side view of a trailer and part of a tractor with the preferred embodiment of the invention applied to the trailer and tractor.

Figure 2 is a view similar to Figure 1 but showing the parts in a separated position ready for the tractor to move away from the trailer.

Figure 3 is a fragmentary sectional view through Figure 1 on line 3—3, the same being on an enlarged scale.

Figure 4 is a top plan view of the structure shown in Figure 3.

Figure 7 is a sectional view through Figure 5, approximately on line 7—7.

Figure 8 is a fragmentary sectional view through Figure 5, approximately on line 8—8.

Figure 9 is a side view of the structure shown in Figure 8, the locking lever being omitted.

Figure 10 is a detail sectional view through Figure 5, approximately on line 10—10.

Figure 11 is a detail sectional view through Figure 5, approximately on line 11—11.

Figure 5:
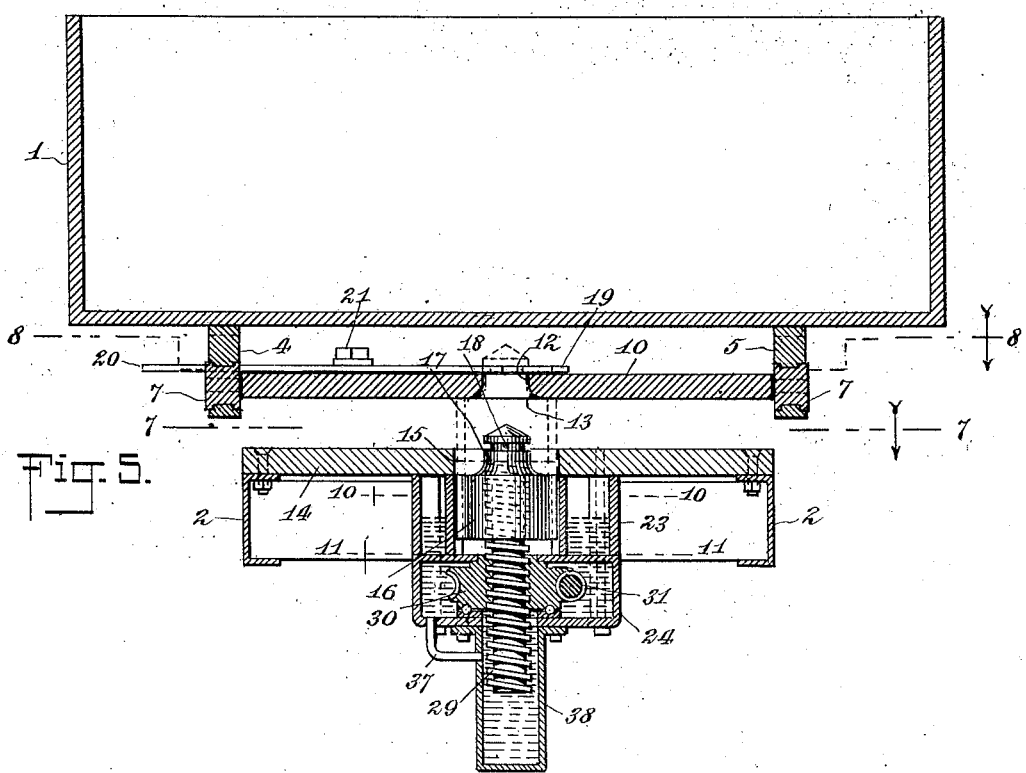
Figure 5 is an enlarged sectional view through Figure 2, approximately on line 5—5.

Referring to the accompanying drawings by numerals, 1 indicates a trailer and 2 a tractor. The tractor and trailer may be of any desired construction in its general make up but is provided with certain specific members whereby an improved hoist and coupling structure is presented which embodies the invention. As indicated in Figures 1 and 2, a swinging rest 3 is provided adapted to support the front end of a trailer 1 when the same is not supported by the tractor 2. This rest may be of any desired structure and when not in use is swung to the position shown in Figure 1. Mounted on the trailer 1 are brackets 4 and 5, each bracket being provided with a cut away portion 6 carrying a sliding journal box 7 normally held in a central position by the springs 8 and 9. A supporting circular plate 10 is carried by the respective boxes 7 through the use of journal pins 11 extending from the disk or plate 10. By this construction and arrangement, the disk or plate 10 may be rocked on the pins 11 and may be moved independently rearwardly or forwardly a short distance against the action of the respective springs 8 and 9. This permits a slight free movement of the trailer 1 whereby different irregularities in the road are easily taken care of.

Figure 6:
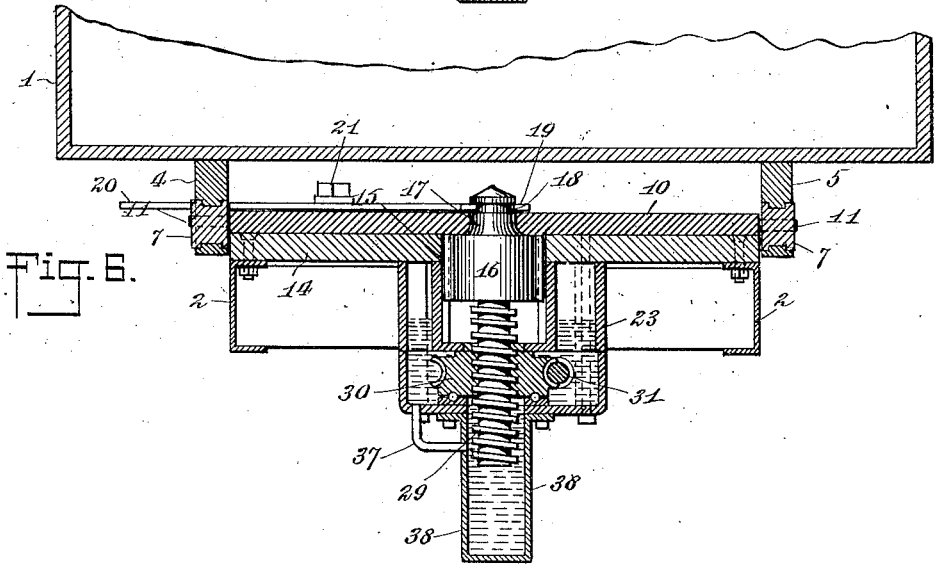
Figure 6 is a view similar to Figure 5 but showing the trailer lowered.

As indicated in Figure 5, the disk 10 is provided with an aperture 12, said aperture having a rounded portion or shoulder 13. Co-acting with the disk or plate 10 is a second disk or plate 14 acting as a turntable and support. The turntable 14 is riveted or otherwise rigidly secured to the tractor 2 and is provided with an aperture 15 through which the coupling head 16 is adapted to be moved. This coupling head merges into a coupling pin 17 having an annular groove 18. When the parts are coupled together as shown in Figures 1 and 6, the lower part of the groove is preferably flush with the upper part of the disk 10 whereby the locking U-shaped member 19 (Figure 8) may be moved over into the groove 18 by the lever 20 pivotally mounted at 21 on the plate 10. A suitable pin 22 of any desired kind is fitted into a suitable aperture in the disk 10 after the lever 20 has moved the locking member 19 over into the locked position whereby the parts cannot accidentally become disengaged. When the U-shaped locking member 19 is in operative position, the tractor cannot become separated from the trailer but the trailer may freely swing and also the rear end may move up and down. Bolted or othewise rigidly secured to the turntable 14 is a box or housing 23 and below this is arranged a second box or housing 24. Forming part of the box 23 is a central section 25 having a bore 26, said bore merging into suitable side grooves 27 adapted to fit the respective tongues or flanges 28 extending from the head 16. By reason of this construction and arrangement, the head 16 may freely move upwardly and downwardly but cannot rotate. A screw member 29 is preferably rigidly connected with the head 16 and moves said head upwardly and downwardly through the action of the worm gear 30 which has a central bore provided with threads accommodating the threads on the screw member 29. A worm 31 continually meshes with the worm wheel 30, said worm being rigidly connected with a shaft 32 (Figure 1) carrying a sprocket 33 over which a chain 34 passes. Said chain also passes over a sprocket wheel 35 rigidly secured to the shaft 36. It will thus be seen that whenever shaft 36 is rotated, worm wheel 30 will be rotated and, consequently, the screw member 29 and head 16 will be raised or lowered according to the direction of rotation of the shaft 36. This action will cause the upper end of the head 16 to raise the plate 10 and associated parts as shown in Figure 5 or lower the same until the parts are in the position shown in Figure 6 or that shown in Figure 2, according to what is desired. It will be noted that the boxes 23 and 24 are in free communication and that the box 24 is completely filled with oil and box 23 partially filled. A pipe 37 is provided as shown in Figure 6 which acts as a by-pass from the lower part of box 24 to a tubular member 38, said tubular member having a closed bottom. By reason of the construction shown in Figures 5 and 6, whenever the screw member 29 is moved downwardly into the tubular member 38, oil will be forced therefrom through the ball bearings and also through by-pass 37 so that the worm gear 30 and associated parts will be well lubricated as well as the screw member 29. When the parts are moved upwardly to the dotted position shown in Figure 5, the oil will gravitate or be drawn back into the tubular member 38 and the lower part of the boxes 23 and 24. This back and forth movement of the oil keeps all the parts well lubricated and also permits certain parts to be continually operating in oil.

The shaft 36 is driven from the transmission or other driving mechanism 39 of the tractor 2. A shaft 40 extends from the mechanism 39, said shaft having a gear wheel 41 rigidly secured thereto, said shaft being designed to be driven continually in the same direction. Preferably, the end of shaft 40 is squared as shown in Figure 3 so that the gear wheel 41 may freely slide thereon. In order to produce a proper sliding movement, the bifurcated end 42 of the hand lever 43 straddles the shaft 40 whereby the gear wheel may be readily slid back and forth as desired. When the parts are in the position shown in Figure 1, gear wheel 41 is disconnected from shaft 39 completely. When it is desired to drive the shaft 36 in one direction, gear wheel 41 is moved over until it engages the gear wheel 44 whereupon power will be transmitted to said gear wheel and from thence to the gear wheel 45 rigidly secured to shaft 36. If it is desired to operate shaft 36 in the opposite direction, gear wheel 41 is moved in the opposite direction until it meshes with the gear wheel 46 whereupon a proper driving action is made with the shaft 36. For instance, the upper end of lever 43 may be moved toward the front of the tractor whereupon shaft 36 will be driven in such a direction as to raise the trailer 1. If it is desired to lower the trailer 1, the lever 43 is moved toward the rear and the opposite connection will be made whereas a vertical or central position will disconnect the various parts.

What I claim is:

1. A trailer hoist and coupler, comprising an apertured connecting member secured to a trailer, an apertured supporting member secured to a tractor and positioned to engage and support the connecting member of the trailer, a pin carried adjacent said apertured supporting member, and means for vertically moving said pin so that it will project into the connecting member of the trailer for connecting the trailer with the tractor, said pin being also provided with shoulders for lifting the trailer when the trailer is to be disconnected from the tractor.

2. In a trailer hoist and coupler, a coupler pin provided with a connecting neck section and a body formed with lifting shoulders, said pin being provided with a threaded member, a worm wheel having a threaded centrally positioned bore, said threaded member fitting into and extending through said bore, a worm meshing with said worm wheel and means for operating said worm in either direction so as to cause said pin to be raised and lowered.

3. In a trailer hoist and coupler, an apertured plate positioned to be carried by a trailer, journal pins extending from said plate on diametrically opposite sides, a journal box for receiving said pin, resilient means for allowing said journal box a limited back and forth movement, a coupling pin carried by said tractor, and means for raising and lowering said pin, said pin when raised fitting into the aperture in said plate whereby the trailer and tractor are connected together.

4. In a trailer hoist and coupler, a coupling pin formed with shoulders acting as hoisting members, means for raising and lowering said pin, an apertured plate co-acting with said pin carried by the trailer, and means for pivotally mounting said plate on the trailer, said means including a horizontally yielding journal box whereby said plate may be slightly adjusted to register with the pin when the same is brought therebeneath.

5. A trailer hoist and coupler, comprising an apertured supporting member carried by the trailer, the aperture in the supporting member being substantially centrally of the trailer, a supporting plate carried by the tractor formed with an aperture, a combined coupling and hoist pin carried by the tractor and positioned to move through the aperture in said supporting plate and from thence into the aperture in the supporting member on the trailer for connecting the trailer with the tractor, said pin being positioned on the tractor on a central longitudinal line thereof whereby the same will readily register with the aperture in the supporting member on the trailer.

6. A trailer hoist and coupler, comprising an apertured plate connected to the trailer, an apertured plate connected to the tractor adapted to be moved into line with the apertured plate of the trailer, a vertically movable pin arranged to move vertically through the aperture in the apertured plate of the tractor so that part thereof will project into the apertured plate in the trailer, said pin having a threaded section, a driving mechanism for driving said pin so as to move the same upwardly and downwardly vertically, said driving mechanism including a gear threaded onto said threaded section, means for preventing a vertical movement of the gear without interfering with its rotary movement, and means for actuating said gear.

7. In a trailer hoist and coupler, an apertured plate connected to the trailer, an apertured plate connected to the tractor, guides connected to the last mentioned plate, a pin positioned to be guided by said guides and to move through the apertured plate on the tractor, said pin having a coupling projection at one end and an elevating projection at the other end, means co-acting with the elevating projection for causing the pin to be raised, said pin being formed with shoulders so that when it is raised the coupling projection will fit into the aperture of the plate carried by the trailer and said shoulders will engage said plate for elevating the plate and trailer.

WILLIAM MAYER.